United States Patent
Hu

(10) Patent No.: US 9,542,760 B1
(45) Date of Patent: Jan. 10, 2017

(54) PARALLEL DECODING JPEG IMAGES

(71) Applicant: Amazon Technologies, Inc., Seattle, WA (US)

(72) Inventor: Hao Hu, Belmont, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 81 days.

(21) Appl. No.: 14/575,382

(22) Filed: Dec. 18, 2014

(51) Int. Cl.
*G06T 9/00* (2006.01)
*G06T 1/20* (2006.01)
*G06T 1/60* (2006.01)

(52) U.S. Cl.
CPC . *G06T 9/00* (2013.01); *G06T 1/20* (2013.01); *G06T 1/60* (2013.01)

(58) Field of Classification Search
None
See application file for complete search history.

(56) References Cited

U.S. PATENT DOCUMENTS

| | | | | |
|---|---|---|---|---|
| 5,668,599 A * | 9/1997 | Cheney | | H04N 5/4401 348/E5.108 |
| 7,397,959 B1 * | 7/2008 | Volkoff | | H03M 7/30 382/209 |
| 2011/0013850 A1 * | 1/2011 | Wang | | H04N 19/46 382/233 |
| 2012/0155767 A1 * | 6/2012 | Zhu | | H04N 19/436 382/173 |
| 2012/0200559 A1 * | 8/2012 | Ahn | | G06T 15/00 345/419 |
| 2016/0007037 A1 * | 1/2016 | Zhao | | H04N 19/45 382/233 |

* cited by examiner

*Primary Examiner* — Jacinta M Crawford
*Assistant Examiner* — Diane Wills
(74) *Attorney, Agent, or Firm* — Seyfarth Shaw LLP; Ilan N. Barzilay; Cyrus A. Miller

(57) ABSTRACT

Devices, systems and methods are disclosed for preprocessing JPEG images to enable parallel decoding and for parallel decoding of JPEG images. A JPEG image may be preprocessed to enable parallel decoding by embedding restart (RST) markers within the JPEG data and embedding information in an application (APPn) marker, which may be included in a header associated with the JPEG data. Using the RST markers and information included in the APPn marker, a device may separate the JPEG data into sections and decode the sections in parallel using multiple cores to reduce a time between acquiring and rendering the JPEG image. The parallel outputs may be stored to identified locations in a buffer so that the finished outputs are sequentially stored as a complete decoded JPEG image.

18 Claims, 12 Drawing Sheets

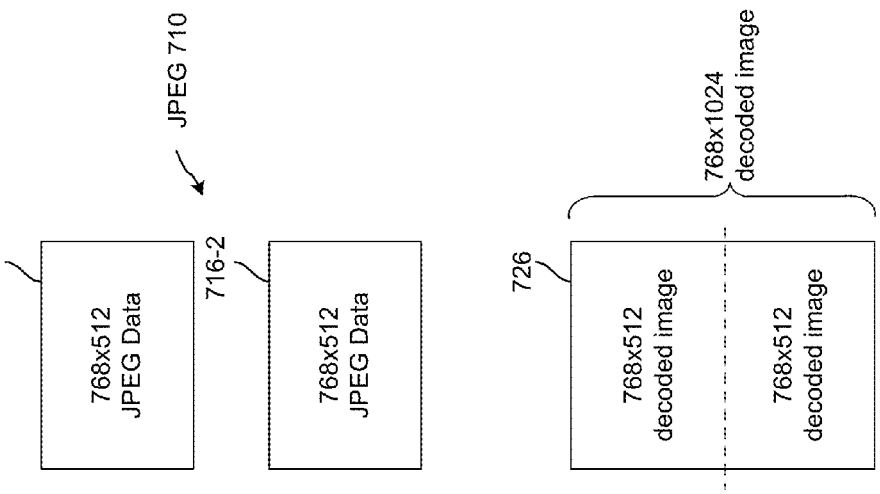
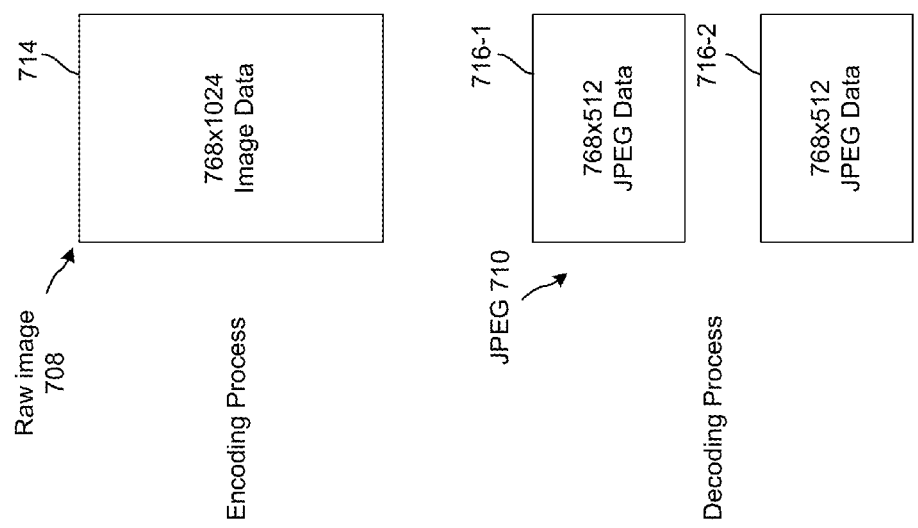

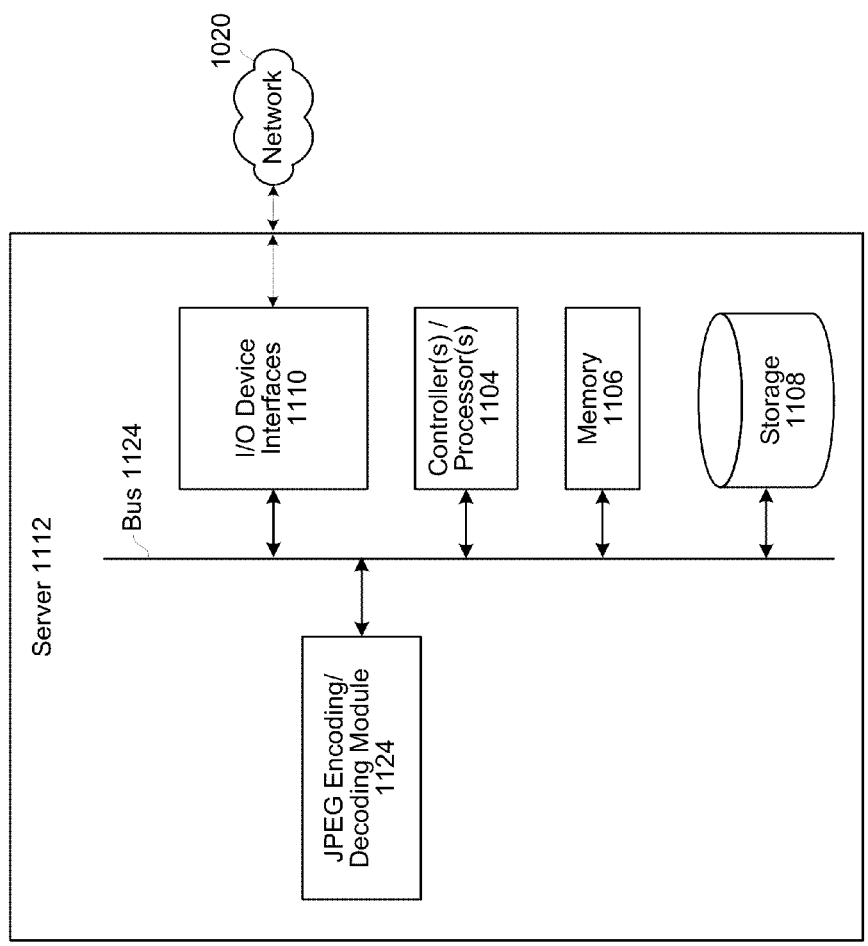

PARALLEL DECODING JPEG IMAGES

BACKGROUND

With the advancement of technology, the use and popularity of electronic devices, such as mobile devices, has increased considerably. Mobile devices, such as smart phones and tablet computers, are commonly used to exchange and view images.

BRIEF DESCRIPTION OF DRAWINGS

For a more complete understanding of the present disclosure, reference is now made to the following description taken in conjunction with the accompanying drawings.

FIGS. 7A-7B illustrate an example of preparing a JPEG image for parallel decoding and parallel decoding the JPEG image using multiple cores according to embodiments of the present disclosure.

FIGS. 11A-11B illustrate block diagrams conceptually illustrating example components of a system including one or more of a computing device and a remote server according to embodiments of the present disclosure.

DETAILED DESCRIPTION

Many Joint Photographic Experts Group (JPEG) images are encoded in a bit-by-bit data stream, which only allows the data to be decoded sequentially. Therefore, when a JPEG image is decoded on a computing device (e.g., a smart phone, tablet computer, etc.), the JPEG data is generally decoded sequentially using a single processing core even when multiple cores (e.g., in a multi-core processor or multi-core system) are available. This may result in an undesired delay when decoding and rendering the JPEG image, which may be exacerbated by a large JPEG image or multiple JPEG images on a single screen.

To reduce the delay, devices, systems and methods are disclosed for encoding JPEG images to enable parallel decoding and for the actual parallel decoding of the JPEG images. For example, a JPEG image may be preprocessed to enable parallel decoding by embedding restart (RST) markers within the JPEG data and embedding information in an application (APPn) marker, which may be located in a header associated with the JPEG data. Using the RST markers and the APPn marker(s), a device may separate the JPEG data into sections and decode the sections in parallel using multiple cores (with each core decoding a specific section) to reduce a delay between acquiring and rendering the JPEG image. The parallel outputs may be stored to identified locations in a buffer so that the finished outputs are sequentially stored as a complete decoded JPEG image.

Figure 1:
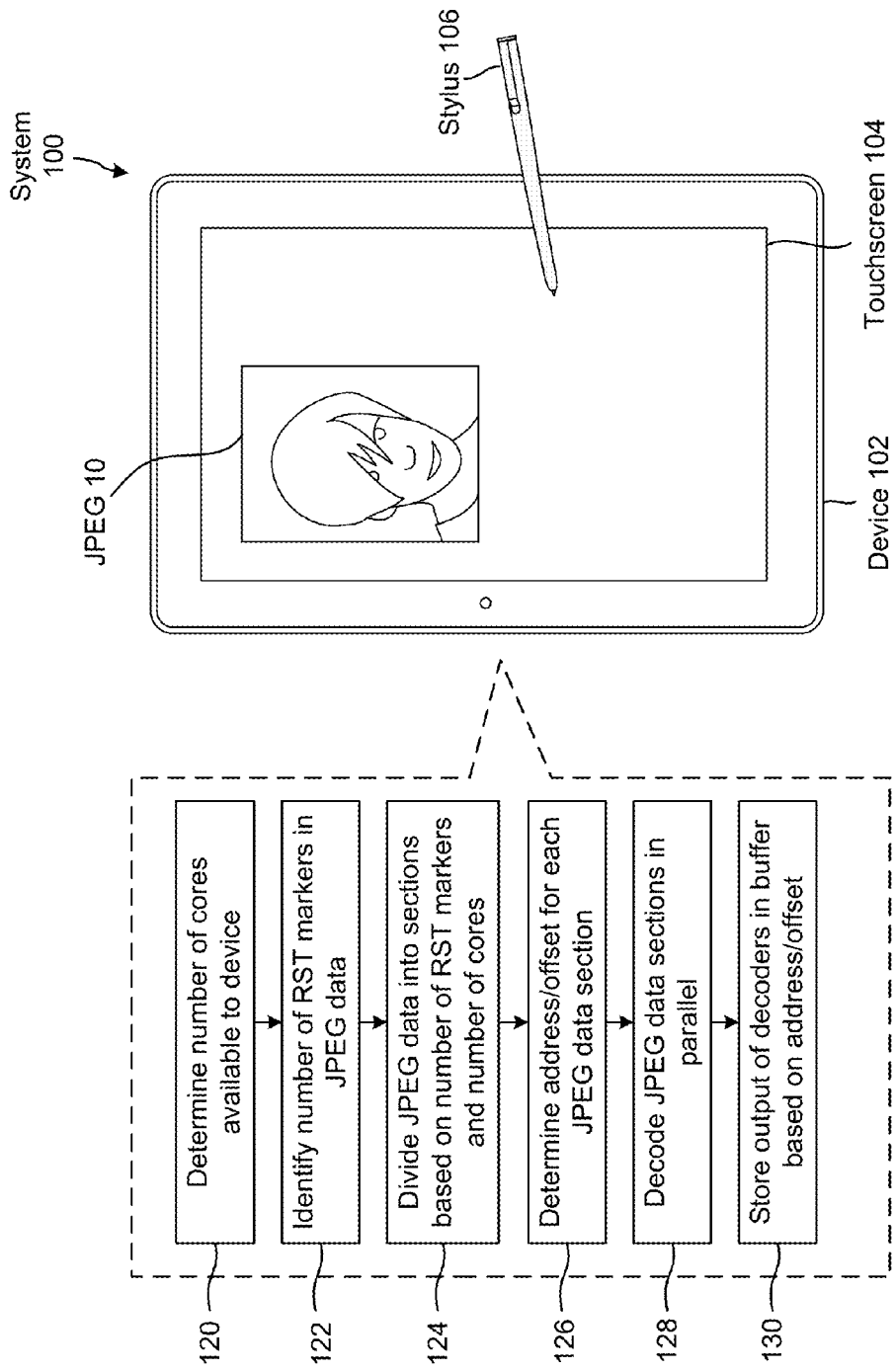
FIG. 1 illustrates an overview of a system for implementing embodiments of the present disclosure.

FIG. 1 illustrates an overview of a system 100 for implementing embodiments of the disclosure. The system includes a computing device 102 having a display touchscreen 104. The touchscreen 104 is a display capable of receiving input via contact between an object (such as a finger, stylus, etc.) and the screen. As shown in FIG. 1, the display 104 is displaying a JPEG image 10. To reduce a delay between the device 102 acquiring the JPEG image 10 and rendering the JPEG image 10, the device 102 may separate JPEG data associated with the JPEG image 10 into sections and decode the sections in parallel using multiple cores. The parallel outputs may be stored to identified buffer locations so that the finished outputs may be sequentially stored as a complete decoded image. For example, and as explained below, the identified buffer locations may be determined based on an initial buffer location, a band height of the sections, a prior number of sections, a number of bytes per pixel and/or a byte offset associated with each of the sections.

The device 102 may determine (120) a number of cores available to the device 102. For example, the device 102 may support multiprocessing, either by having multiple processing cores, a multi-core processor having two or more independent central processing units (CPUs), or a combination thereof. Although a number of terms may be used, hereinafter, for ease of explanation this disclosure will refer to individual cores, CPUs and processors as "cores." The device 102 may be a "multi-core device" or "multi-core system" having multiple CPUs, whether the device 102 has multiple cores on one die, multiple dies on one package, multiple packages in one system unit or multiple separate processors integrated to share main memory and peripherals. The device 102 may allow concurrent multithreading, which means that the device 102 is capable of running a number of processing threads at least partially in parallel (e.g., multiple processing threads may be running concurrently, contemporaneously, simultaneously, etc., although a duration, begin time and end time of each individual thread may vary). The number of cores included in the device 102 is typically fixed, for example a particular device may have two cores, four cores, six cores, eight cores or more. The device 102 may determine the number of total cores by summing a number of cores in each processor included in the device 102. For example, if a first multi-core processor of the device has four cores and a second multi-core processor of the device has eight cores, the device 102 has a total of 12 cores. In some embodiments, the device 102 may determine a number of available cores that is less than the total number of cores of the device 102. For example, the device 102 may utilize one or more cores for other processes and only make a portion of the total cores available to decode the JPEG image 10.

The device 102 may identify (122) a number of restart (RST) markers in the JPEG data. RST markers may be data embedded within the JPEG data that may be identified by the device 102 and used to separate the JPEG data into smaller sections of JPEG data. However, the disclosure is not limited to RST markers and other kinds of markers may be used, including generic markers that indicate section breaks, without departing from the disclosure. The device 102 may divide (124) the JPEG data into sections based on the number of RST markers and the number of cores available. For example, the device 102 may identify that the JPEG data includes seven RST markers separating the JPEG data into eight series of data. If the device 102 has four available cores, the device 102 may divide the JPEG data into four sections, sending two series of data to each of the four cores. For example, the device 102 may send JPEG data up to the second RST marker to the first core, JPEG data from the second RST marker to the fourth RST marker to the second core, JPEG data from the fourth RST marker to the sixth RST marker to the third core, and JPEG data from the sixth RST marker to the end of the JPEG data to the fourth core. The device 102 may identify the number of RST markers in the JPEG data using information embedded in application (APPn) marker(s), which may be located in a header associated with the JPEG data. For example, an APPn marker may include information associated with the JPEG data, such as information about a height of decoded data corresponding to each section of JPEG data, which are separated by RST markers. The information about the height associated with each section may be embedded in the APPn marker to simplify the decoding process and may be based on a total height associated with the JPEG data divided by the number of RST markers plus one. For example, if the JPEG data includes seven RST markers, the JPEG data may be split into eight sections and each section of JPEG data (e.g., band of data) may be one eighth of the total height associated with the JPEG data. The information included in APPn markers is described in greater detail with regard to FIG. 9 below.

To determine where each core should send its respective output decoded data, the device 102 may determine (126) an address/offset for each eventually decoded JPEG data section. In some embodiments, the device 102 may determine the address/offset in a buffer (e.g., raw image buffer) for each eventually decoded JPEG data section. Thus, each core will know where to start storing its respective decoded data so that the decoded image is sequentially stored upon completion of decoding. For example, the device 102 may identify APPn marker(s), which may be located in a header associated with the JPEG data, and the APPn marker(s) may include additional information to assist the device 102 in determining the address in the buffer for each JPEG data section. Thus, the device 102 may determine a final size of the decoded image and may identify addresses in the buffer for each core to send its respective decoded data. For example, if the JPEG image 10 has four sections that will be processed by four cores, the address/offset for each core may be based on one-quarter the size of the overall decoded image. The device 102 may determine the addresses/offset in the buffer based on a first address corresponding to the desired beginning of the JPEG image 10 and offsets between the first address and a beginning of the second section, the third section and the fourth section, respectively. The offsets may be determined based on a band height of the sections, a prior number of sections, a number of bytes per pixel and/or a byte offset. The band height of the sections may be stored in the APPn marker(s), while the total height and/or byte offset may be stored in the APPn marker(s) and/or determined based on the JPEG image 10. The band height, total height, number of bytes per pixel, byte offset, APPn marker(s) and how to determine the offsets between each of the sections and the first address will be described in greater detail below with regard to FIG. 9. Therefore, after the cores are finished decoding, the decoded image may be stored sequentially in the buffer without later needing to move any of the decoded data.

In some embodiments, the device 102 may use the steps described above to determine the address/offset in a memory or hard disk for each eventually decoded JPEG data section, instead of the buffer. By calculating the addresses using the offsets, the decoded image may be stored sequentially after the decoding process is complete. However, in other embodiments the device 102 may determine the address/offset in the memory or the hard disk for each JPEG data section without using an offset, so that decoded image data associated with each JPEG data section is stored to separate locations within the memory or hard disk. Thus, the decoded image data may not be stored sequentially after the decoding process is complete. Instead, the device 102 may store the decoded image data in the separate locations or may combine the decoded image data in a new location in the memory or the hard disk.

The device 102 may decode (128) the JPEG data sections in parallel using the cores on the device 102. The cores may include decoders to decode the JPEG data. The device 102 may store (130) the output of decoders in the buffer based on the addresses. For example, as discussed above, the first core may decode the first section, the second core may decode the second section, the third core may decode the third section and the fourth core may decode the fourth section. The first core may output the decoded first section to a first location in the buffer using a first address, the second core may output the decoded second section to a second location in the buffer using a second address, the third core may output the decoded third section to a third location in the buffer using a third address, and the fourth core may output the decoded fourth section to a fourth location in the buffer using a fourth address. The first location may be prior to the second location, which may be prior to the third location, which may be prior to the fourth location, so that after decoding the decoded data begins at the first location and extends contiguously through the end of the decoded data.

Figure 2:
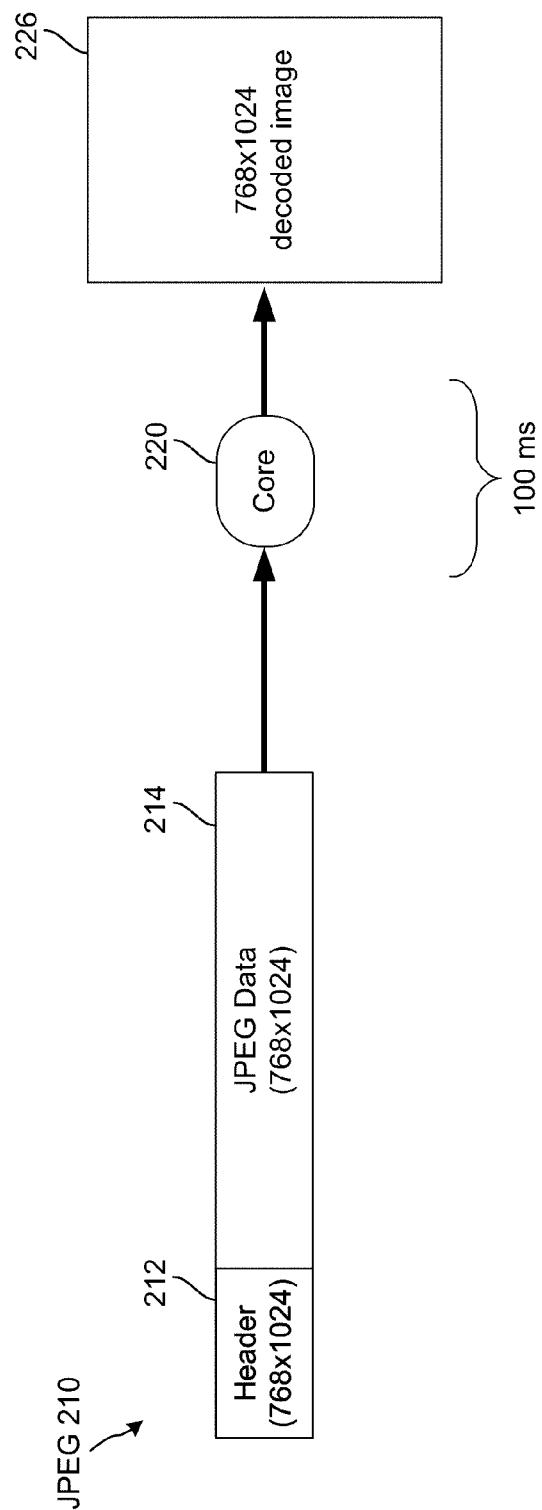
FIG. 2 illustrates an example of sequentially decoding a JPEG image sequentially using a single core.

FIG. 2 illustrates an example of sequentially decoding a JPEG image sequentially using a single core. As illustrated in FIG. 2, a JPEG 210 may include a header 212 and image data 214 (also called JPEG data). As shown, the header 212 may indicate a resolution associated with the JPEG data, which in this example is 768 pixels by 1024 pixels. The JPEG data 214 may be decoded using a core 220 and may be output to as a decoded image 226. The decoding may take a certain period of time (e.g., 100 ms) and a resolution of the decoded image 226 may be 768 pixels by 1024 pixels.

Figure 3:
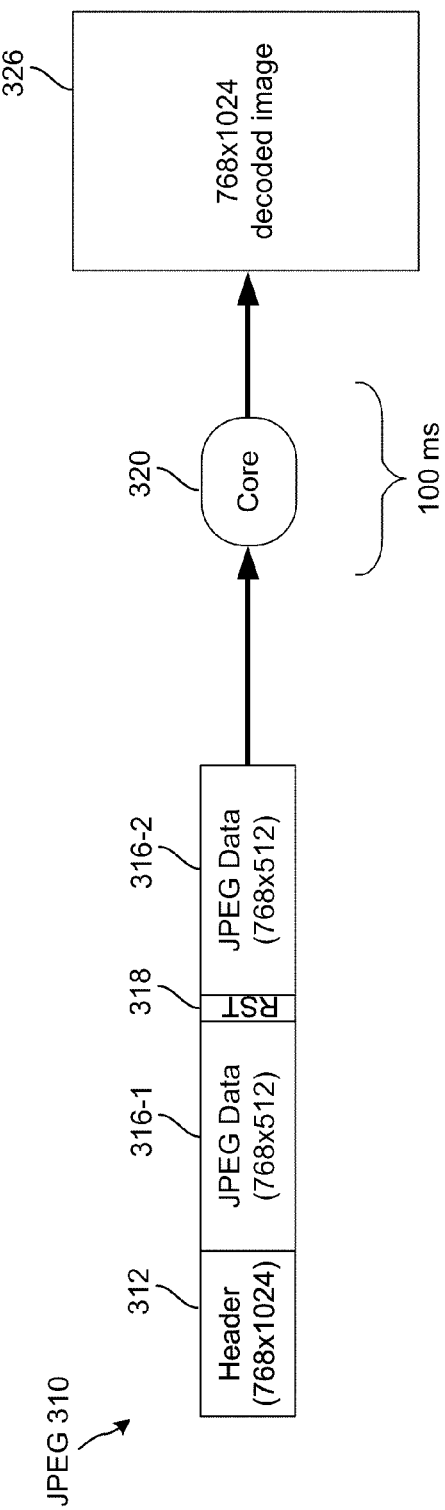
FIG. 3 illustrates an example of sequentially decoding a JPEG image prepared for parallel decoding using a single core according to embodiments of the present disclosure.

FIG. 3 illustrates an example of sequentially decoding a JPEG image prepared for parallel decoding using a single core according to embodiments of the present disclosure. As illustrated in FIG. 3, a JPEG 310 may include a header 312, first JPEG data 316-1, a RST marker 318 and second JPEG data 316-2. The header may indicate a resolution associated with the total JPEG data, which in this example is 768 pixels by 1024 pixels. The header 312 may also include information regarding the presence and position of the RST marker 318. The RST marker 318 separates the first JPEG data 316-1 from the second JPEG data 316-2, so the first JPEG data 316-1 includes data corresponding to 768 pixels by 512 pixels and the second JPEG data 316-2 includes data corresponding to 768 pixels by 512 pixels. The first JPEG data 316-1 and the second JPEG data 316-2 may be decoded using a core 320 and may be output as a decoded image 326.

As there is only a single core, the decoding may take the same period of time (e.g., 100 ms) as the example illustrated in FIG. 2.

Figure 4:
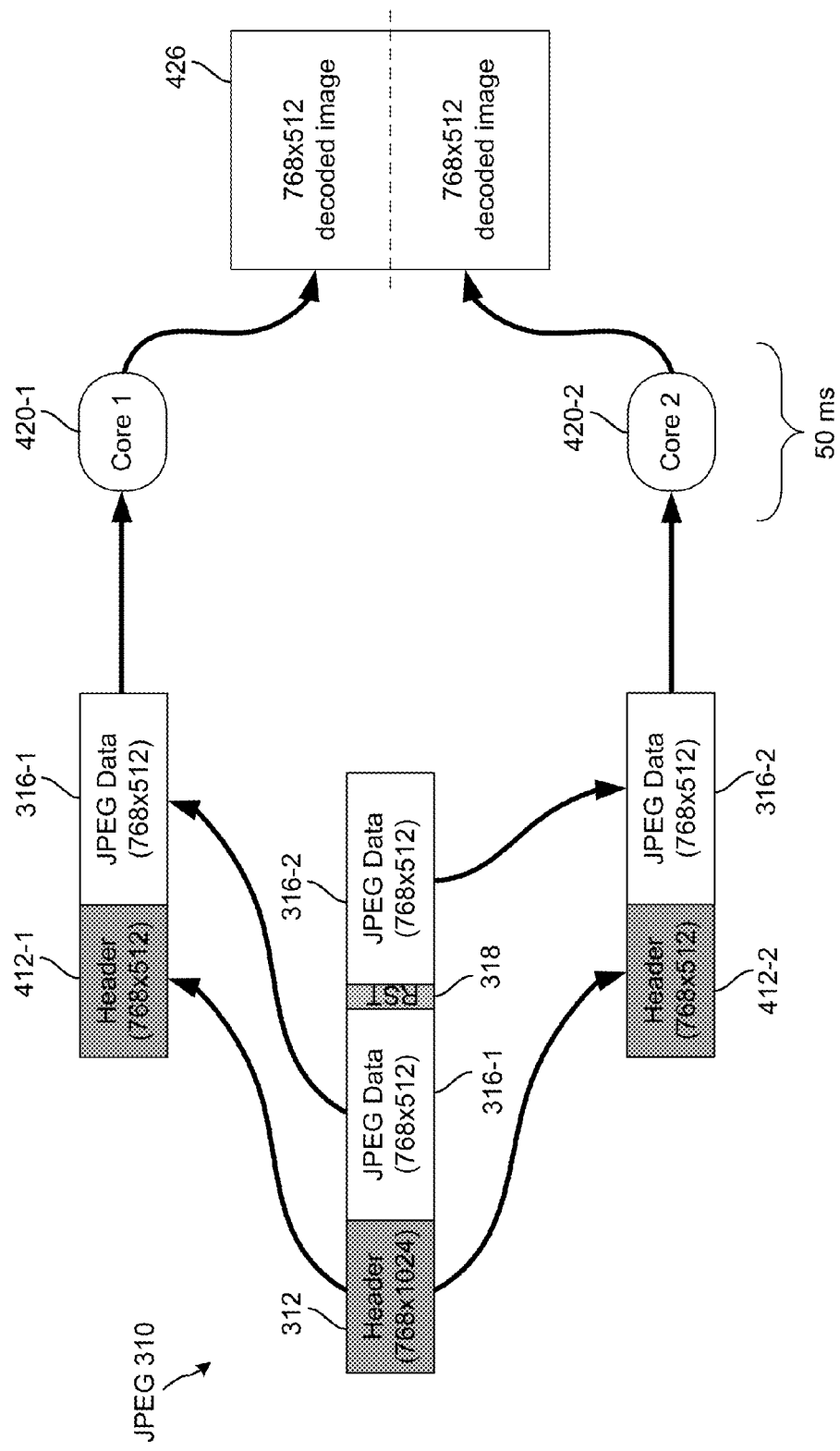
FIG. 4 illustrates an example of parallel decoding a JPEG image using multiple cores according to embodiments of the present disclosure.

FIG. 4 illustrates an example of parallel decoding a JPEG image using multiple cores according to embodiments of the present disclosure. As illustrated in FIG. 4, a JPEG 310 may include a header 312, first JPEG data 316-1, a RST marker 318 and second JPEG data 316-2. The header 312 may indicate a resolution associated with the total JPEG data, which in this example is 768 pixels by 1024 pixels. The header 312 may also include information regarding the presence and position of the RST marker 318. The RST marker 318 separates the first JPEG data 316-1 from the second JPEG data 316-2, so the first JPEG data 316-1 includes data corresponding to 768 pixels by 512 pixels and the second JPEG data 316-2 includes data corresponding to 768 pixels by 512 pixels. In this example, the device 102 includes two cores; a first core 420-1 and a second core 420-2. Therefore, the device 102 may parallel decode the JPEG 310 to reduce a delay caused by the decoding process.

To parallel decode the JPEG 310, the device 102 may separate the first JPEG data 316-1 from the second JPEG data 316-2 based on the RST marker 318. The device 102 may generate a first reduced header 4412-1 indicating a resolution associated with the first JPEG data 316-1 and a second reduced header 4412-2 indicating a resolution associated with the second JPEG data 316-2. To generate the reduced headers 412, the device 102 may copy the header 312 and change a height associated with the header 312 (e.g., replace the total height of the JPEG 310 with a band height associated with the JPEG data 316). For example, the device 102 may copy the header 312 and modify the height associated with the header 312 from 1024 lines of pixels to 512 lines of pixels to generate the reduced headers 412. Therefore, the first reduced header 412-1 may indicate that the corresponding first JPEG data 316-1 includes data corresponding to 768 pixels by 512 pixels. Similarly, the second reduced header 412-2 may indicate that the corresponding second JPEG data 316-2 includes data corresponding to 768 pixels by 512 pixels. In some embodiments, heights associated with the first JPEG data 316-1 and the second JPEG data 316-2 may be different. For example, if the JPEG 310 is not split evenly, the first JPEG data 316-1 may have a height equal to the band height and the second JPEG data 316-2 may have a height based on the remaining rows of pixels, which is a difference between the total height of the JPEG 310 and the band height.

The first JPEG data 316-1 may be decoded using the first core 420-1 and may be output as a top portion of decoded image 426. The second JPEG data 316-2 may be decoded using the second core 420-2 and may be output as the bottom portion of the decoded image 426. The top portion and the bottom portion each include 768 pixels by 512 pixels, for a combined resolution of 768 pixels by 1024 pixels for the decoded image 426. As there are two cores, the decoding may take roughly half the period of time (e.g., 50 ms) as the examples illustrated in FIGS. 2-3. However, while a decoding time for a single core may be approximately twice a decoding time for two cores, parallel decoding may not necessarily decrease a time associated with the overall decoding process by exactly a factor of two. Instead, minor delays (e.g., 1-2 ms) may be caused by generating the reduced headers 412 from the header 312, and memory constraints, such as memory access limitations, may cause additional delays (e.g., roughly 3-5 ms), as the two cores share limited resources such as memory. Thus, the decoding time using the single core may be roughly 100 ms, while the decoding time using two cores may be roughly 55-57 ms.

Figure 5:
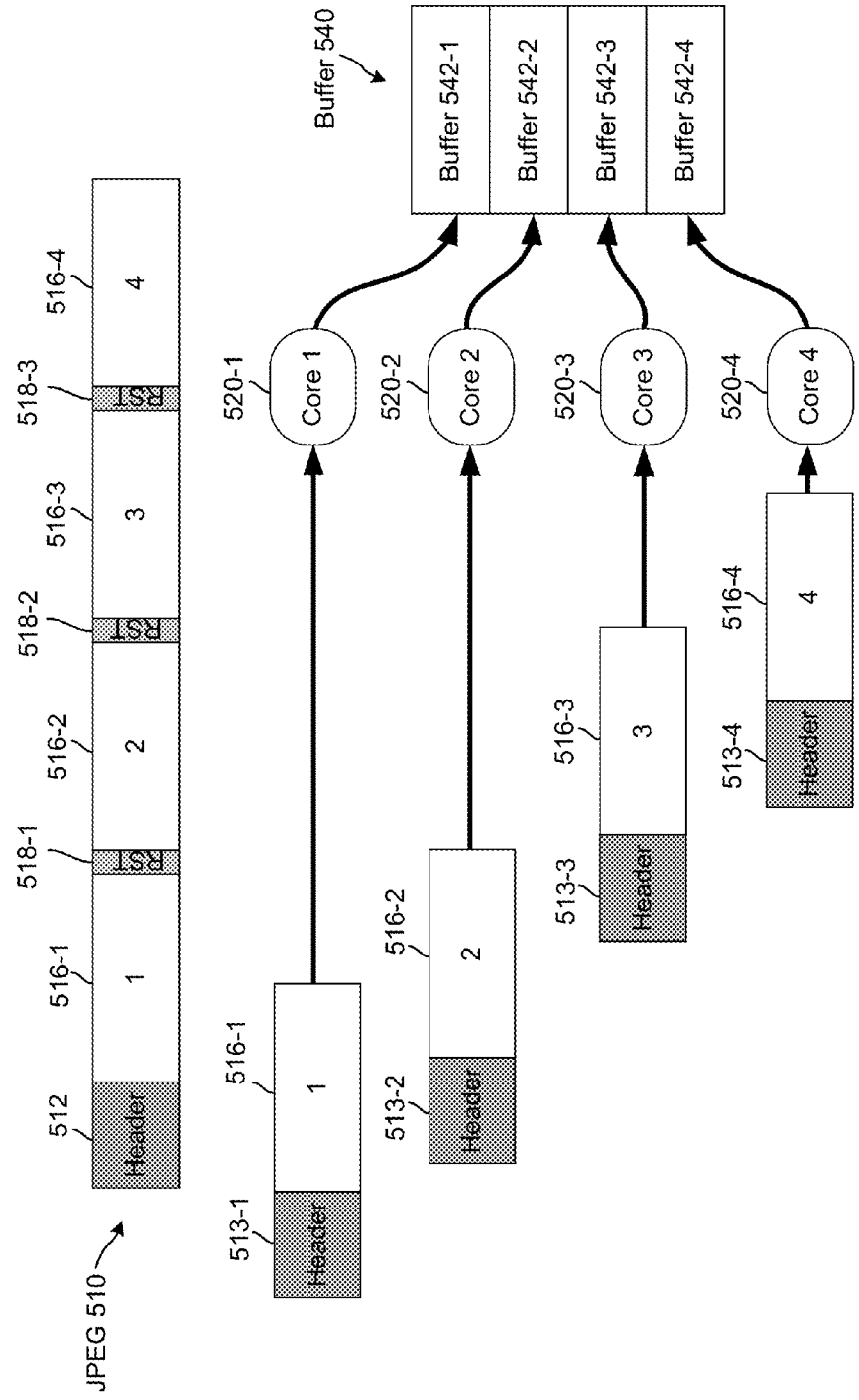
FIG. 5 illustrates an example of parallel decoding a JPEG image using multiple cores outputting to buffer locations according to embodiments of the present disclosure.

FIG. 5 illustrates an example of parallel decoding a JPEG image using multiple cores outputting to locations within a buffer according to embodiments of the present disclosure. In contrast to FIG. 4, FIG. 5 omits certain details such as a resolution associated with each section of JPEG data. Instead, FIG. 5 emphasizes how the multiple cores output to separate locations in a buffer to form a sequential series of decoded image data.

As illustrated in FIG. 5, a JPEG 510 may include a header 512, first JPEG data 516-1, a first RST marker 518-1, second JPEG data 516-2, a second RST marker 518-2, third JPEG data 516-3, a third RST marker 518-3 and fourth JPEG data 516-4. While not illustrated in FIG. 5, each of the sections of JPEG data 516-1 through 516-4 may include data corresponding to a quarter of the total decoded image data. In this example, the device 102 includes four cores; a first core 520-1, a second core 520-2, a third core 520-3 and a fourth core 520-4. Therefore, the device 102 may parallel decode the JPEG 510 to reduce a delay caused by the decoding process.

To parallel decode the JPEG 510, the device 102 may separate the sections of JPEG data 516-1 through 516-4 using the RST markers 518. The device 102 may generate reduced headers 513-1 through 513-4, each indicating a resolution associated with of each of the sections of JPEG data 516-1 through 516-4, which will each be a quarter of the total resolution indicated by the header 512. The device 102 may copy the header 512 and change a height associated with the header 512 to generate the reduced headers 513. For example, the device 102 may copy the header 512 and replace the total height of the JPEG 510 associated with the header 512 (e.g., 1024 lines of pixels or scan lines) with the band height associated with the JPEG data 516 (e.g., 256 lines of pixels or scan lines) to generate the reduced headers 513. In some embodiments, heights associated with each of the JPEG data 516 may be different. For example, if the JPEG 510 is not split evenly, the first JPEG data 516-1, the second JPEG data 516-2 and the third JPEG data 516-3 may have a height equal to the band height and the fourth JPEG data 516-4 may have a height based on the remaining rows of pixels, which is a difference between the total height of the JPEG 510 and three times the band height. For example, if the total height of the JPEG 510 is 1016 lines, the first JPEG data 516-1, the second JPEG data 516-2 and the third JPEG data 516-3 may have a height equal to 256 lines, while the fourth JPEG data 516-4 may have a height equal to 248 lines (e.g., 1024−3(256)=248).

The first JPEG data 516-1 may be decoded using the first core 520-1 and may be output to a first location 542-1 in a buffer 540. The first location 542-1 may be a starting address of the buffer 540, which may be a raw image buffer or the like. The second JPEG data 516-2 may be decoded using the second core 520-2 and may be output to a second location 542-2 in the buffer 540. The second location 542-2 may be determined by the device 102 based on a height associated with the first JPEG data 516-1 and information included in the JPEG 510, such as APPn markers embedded in the JPEG 510, as will be discussed in greater detail below with regard to FIG. 9. The third JPEG data 516-3 may be decoded using the third core 520-3 and may be output to a third location 542-3 in the buffer 540. The third location 542-3 may be determined by the device 102 based on a height associated with the first JPEG data 516-1 and the second JPEG data 516-2 and information included in the JPEG 510, such as APPn markers embedded in the JPEG 510. The fourth JPEG data 516-4 may be decoded using the fourth core 520-4 and may be output to a fourth location 542-4 in the buffer 540. The fourth location 542-4 may be determined by the device 102 based on a height associated with the first JPEG data 516-1, the second JPEG data 516-2 and the third JPEG data 516-3 and information included in the JPEG 510, such as APPn markers embedded in the JPEG 510. In some embodiments, the buffer 540 may be a location in memory or storage associated with the device 102.

The device 102 may determine exact locations 542 in the buffer 540 so that the decoded image is stored in a continuous, sequential order in the buffer 540. For example, an end of decoded data corresponding to the first JPEG data 516-1 may be subsequent to a beginning of decoded data corresponding to the second JPEG data 516-2. Similarly, an end of decoded data corresponding to the second JPEG data 516-2 may be subsequent to a beginning of decoded data corresponding to the third JPEG data 516-3 and an end of decoded data corresponding to the third JPEG data 516-3 may be subsequent to a beginning of decoded data corresponding to the fourth JPEG data 516-4. In addition, as there are four cores, the decoding may take roughly a quarter of the period of time (e.g., 25 ms) as the examples illustrated in FIGS. 2-3. However, while a decoding time for a single core may be approximately four times a decoding time for four cores, parallel decoding may not necessarily decrease a time associated with the overall decoding process by exactly a factor of four. Instead, minor delays (e.g., 1-2 ms) may be caused by generating the reduced headers 513 from the header 512, and memory constraints, such as memory access limitations, may cause additional delays (e.g., roughly 3-5 ms), as the four cores share limited resources such as memory. Thus, the decoding time using the single core may be roughly 100 ms, while the decoding time using four cores may be roughly 30 ms.

Figure 6:
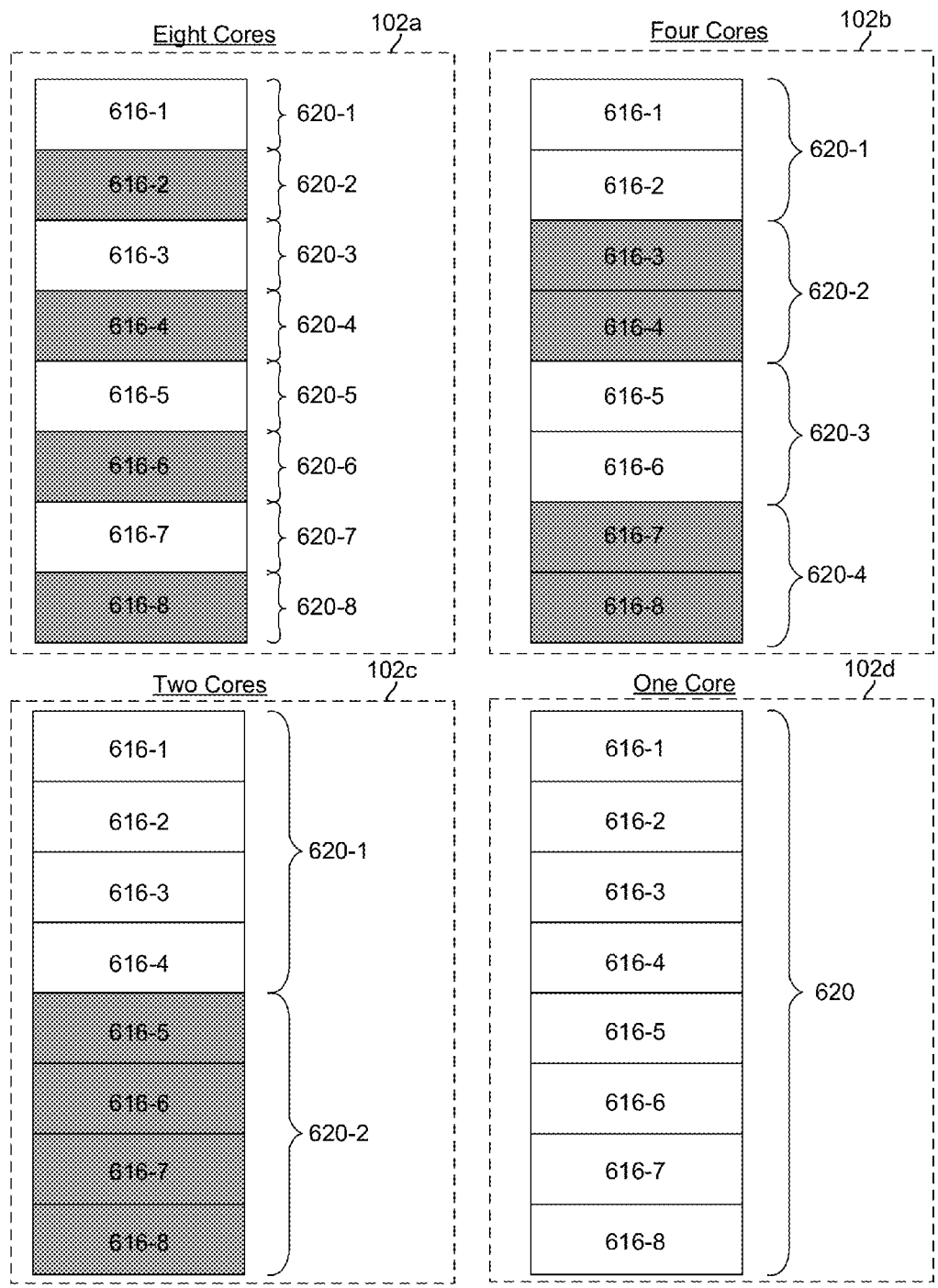
FIG. 6 illustrates examples of parallel decoding a JPEG image based on a number of cores according to embodiments of the present disclosure.

FIG. 6 illustrates simplified examples of parallel decoding a JPEG image based on a number of cores according to embodiments of the present disclosure. As illustrated in FIG. 6, the device 102 may adaptively determine how to divide a JPEG based on a number of cores, corresponding to steps 122 and 124 illustrated in FIG. 1.

FIG. 6 illustrates four different examples of JPEG data 616 divided by RST markers into eight sections (e.g., 616-1 to 616-8). In the first example, a first device 102a may include eight cores (e.g., 620-1 to 620-8) and may therefore decode each of the sections of JPEG data 616 using a separate core 620-1 through 620-8. For example, first JPEG data 616-1 may be decoded by first core 620-1, second JPEG data 616-2 may be decoded by second core 620-2, and so on.

In the second example, a second device 102b may include four cores (e.g., 620-1 to 620-4) and may therefore decode two sections of JPEG data per core 620. For example, first JPEG data 616-1 and second JPEG data 616-2 may be decoded by first core 620-1, third JPEG data 616-3 and fourth JPEG data 616-4 may be decoded by second core 620-2, etc.

In the third example, a third device 102c may include two cores (e.g., 620-1 and 620-2) and may therefore decode four sections of JPEG data 616 per core 620. For example, first JPEG data 616-1 through fourth JPEG data 616-4 may be decoded by first core 620-1, while fifth JPEG data 616-5 through eighth JPEG data 616-8 may be decoded by second core 620-2.

Finally, in the fourth example, a fourth device 102d may include a single core 620 and may therefore decode all eight sections of JPEG data 616 using the core 620. For example, first JPEG data 616-1 through eighth JPEG data 616-8 may be decoded by first core 620 without any reduction in delay caused by the decoding process. As can be appreciated, various combinations of cores and JPEG data sections may be configured according to the present disclosure. Such combinations may not necessarily be evenly divided. For example, a JPEG image divided into eight sections may be processed by only three available cores, in which case one core may process more data portions than the other cores.

In addition to allowing parallel decoding, dividing a JPEG into the sections of JPEG data 616 may allow multi-threading to improve a processing speed and a response time of the device 102. For example, decoding the JPEG may take a fixed period of time (e.g., 4 seconds) during which the device 102 is non responsive to a user of the device 102. By dividing the JPEG into the sections of JPEG data 616, the device 102 may decode a single section and then perform an event check to detect input from the user, thus improving a perceived response time. Similarly, by dividing the JPEG into the sections of JPEG data 616, the device 102 may decode the sections of JPEG data 616 out of order (e.g., decode the first section 616-1, the third section 616-3, the fifth section 616-5, the second section 616-2, and so on) to reduce a delay caused by memory access limitations or other shared resource limitations. Thus, the device 102 may improve a decoding time by improving an efficiency, especially when parallel decoding. Finally, by dividing the JPEG into the sections of JPEG data 616, the device 102 may decode only select sections of JPEG data 616. For example, if the device 102 is zoomed in and displaying only the eighth JPEG data 616-8, the device 102 may decode only the eighth JPEG data 616-8 and ignore the first JPEG data 616-1 through seventh JPEG data 616-7. Alternatively, the device 102 may prioritize decoding the eighth JPEG data 616-8 and decode the eighth JPEG data 616-8 prior to decoding the first JPEG data 616-1 through seventh JPEG data 616-7. FIGS. 7A-7B illustrate an example of encoding a JPEG image for parallel decoding, and then performing the parallel decoding of the JPEG image, using multiple cores according to embodiments of the present disclosure. FIG. 7A illustrates an encoding process performed by the device 102 or a server (not illustrated) to process a raw image 708 to generate a JPEG 710 that supports parallel decoding. The raw image 708 may be obtained directly from an input device (e.g., a camera or other capture device) or from decoding an image using one of multiple file formats, such as JPEG, Tagged Image File Format (TIFF), Graphics Interchange Format (GIF), BMP file format (BMP) or the like. For example, a JPEG file that does not support parallel decoding may be decoded into the raw image 708 and re-encoded to generate JPEG 710, which supports parallel decoding. As illustrated in FIG. 7A, the raw image 708 includes image data 714 corresponding to 768 pixels by 1024 pixels, while the JPEG 710 includes first JPEG data 716-1 corresponding to 768 pixels by 512 pixels and second JPEG data 716-2 corresponding to 768 pixels by 512 pixels, for a combined 768 pixels by 1024 pixels. While the first JPEG data 716-1 is illustrated separately from the second JPEG data 716-2, this is for illustrative purposes only and the first JPEG data 716-1 and the second JPEG data 716-2 may be stored consecutively, separated by a RST marker. In the example of FIG. 7A, a single RST marker is used; increasing a number of RST markers will increase a number of sections of JPEG data 716 and decrease a number of pixels corresponding to each of section of JPEG data 716 accordingly.

FIG. 7B illustrates a decoding process, described in greater detail above, which decodes the JPEG 710 to generate a decoded image 726. The first JPEG data 716-1 may correspond to a top portion of the decoded image 726 while the second JPEG data 716-2 may correspond to a bottom portion of the decoded image 726. In order for the decoding process to be performed in parallel, as illustrated in FIG. 7B, image data 714 needs to include RST markers separating the image data 714 into sections of JPEG data 716. Therefore, the encoding process may be an integral part in reducing a decoding delay by allowing for parallel decoding of JPEG images. For example, as described above, a JPEG file that does not support parallel decoding may be decoded into a raw image and re-encoded to generate a JPEG that allows parallel decoding, therefore reducing a decoding delay associated with the re-encoded JPEG.

Figure 8:
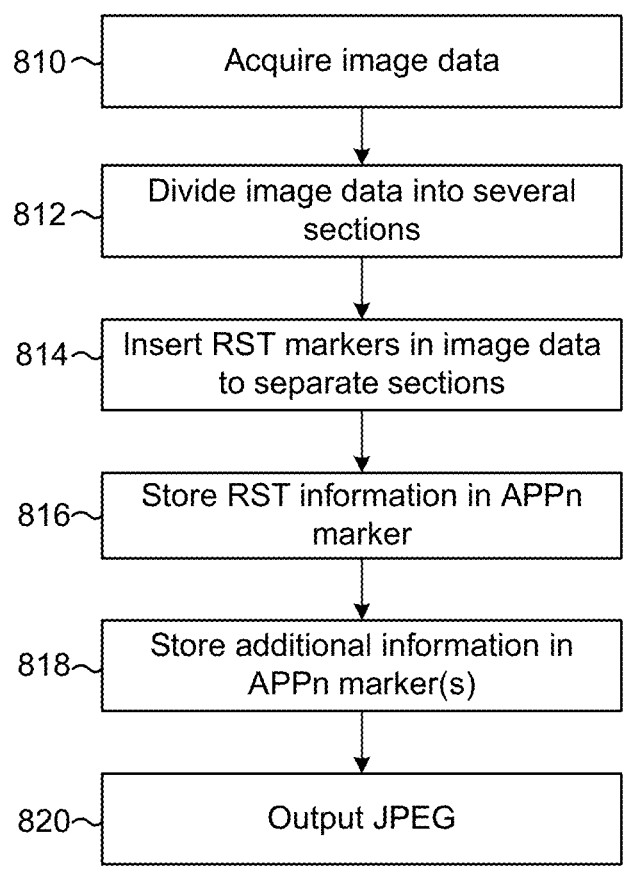
FIG. 8 illustrates a flowchart illustrating an example method for preparing a JPEG image for parallel decoding according to embodiments of the present disclosure.

FIG. 8 illustrates a flowchart conceptually illustrating an example method for encoding a JPEG image for parallel decoding according to embodiments of the present disclosure. The method may be performed by the device 102 or a server (not illustrated). For example, as part of a process of preparing electronic documents for rendering on devices, a server may acquire raw data including text and images and may format the raw data to generate a finished electronic document, such as an ebook, web article, electronic comic book, etc. As part of the formatting, the server may perform the method illustrated in FIG. 8 on images included in the raw data. While described as being performed by a server, the method may be performed by individual devices or even the device 102 without departing from the disclosure.

The server may acquire (810) image data. For example, the server may acquire image data from an image included in raw data to be processed. The server may acquire the image data directly from an input device (e.g., a camera or other capture device) or may decode the image data from a JPEG, TIFF, GIF, BMP or the like.

The server may divide (812) the image data into several sections. For example, the server may divide the image data into n sections, where n is a natural number, based on a predicted or preferred number of cores. In one example, the server may divide the image data into eight sections so that the image data may be decoded in parallel by eight cores. In another example, the server may divide the image data into forty sections to allow the image data to be easily decoded by a number of different cores. For example, a two core system may decode twenty sections per core, a four core system may decode ten sections per core, an eight core system may decode five sections per core and a ten core system may decode four sections per core. Alternatively, the server may divide the image data into other grouping of sections, such as sections using multiples of two.

The server may insert (814) restart (RST) markers in the image data to separate the sections, the image data becoming JPEG data with the RST markers embedded. As an example, the server may insert the RST markers in the image data by commanding an encoder library to insert the RST markers, such as by identifying positions for the RST markers in the image data and issuing commands during the encoding for the RST markers to be inserted at the positions. For n sections, the server may insert n−1 RST markers. For example, for four sections the server may insert three RST markers and for eight sections the server may insert seven RST markers.

The server may store (816) RST information in an application (APPn) marker, which may be included in a header associated with the JPEG data. The server may store (818) additional information in APPn marker(s). For example, the server may create one or more APPn markers storing information so that a device 102 may decode the JPEG data in parallel. In a first example, the APPn markers may include band information about the JPEG data, such as information about a height associated with of each section of JPEG data separated by RST markers. The information about the height of each section may be embedded in the APPn markers to simplify the decoding process and may be based on a total height associated with the JPEG data divided by the number of RST markers plus one. For example, if the JPEG data includes seven RST markers, the JPEG data may be split into eight sections and each section of JPEG data (e.g., band of data) may correspond to one eighth of the total height of the JPEG data. In a second example, the APPn markers may be used to identify address locations for each core to decode to so that the finished decoded image is sequentially stored without additional movement of data. Therefore, the APPn markers may include band information related to the RST markers and/or relative heights of each section of JPEG data. Information included in the APPn marker(s) may be discussed in greater detail below with regard to FIG. 9.

The server may output (820) a JPEG image, including the JPEG data, the RST markers and the APPn marker(s). Therefore, the JPEG image is configured to be parallel decoded using the RST markers and the APPn marker(s).

Figure 9:
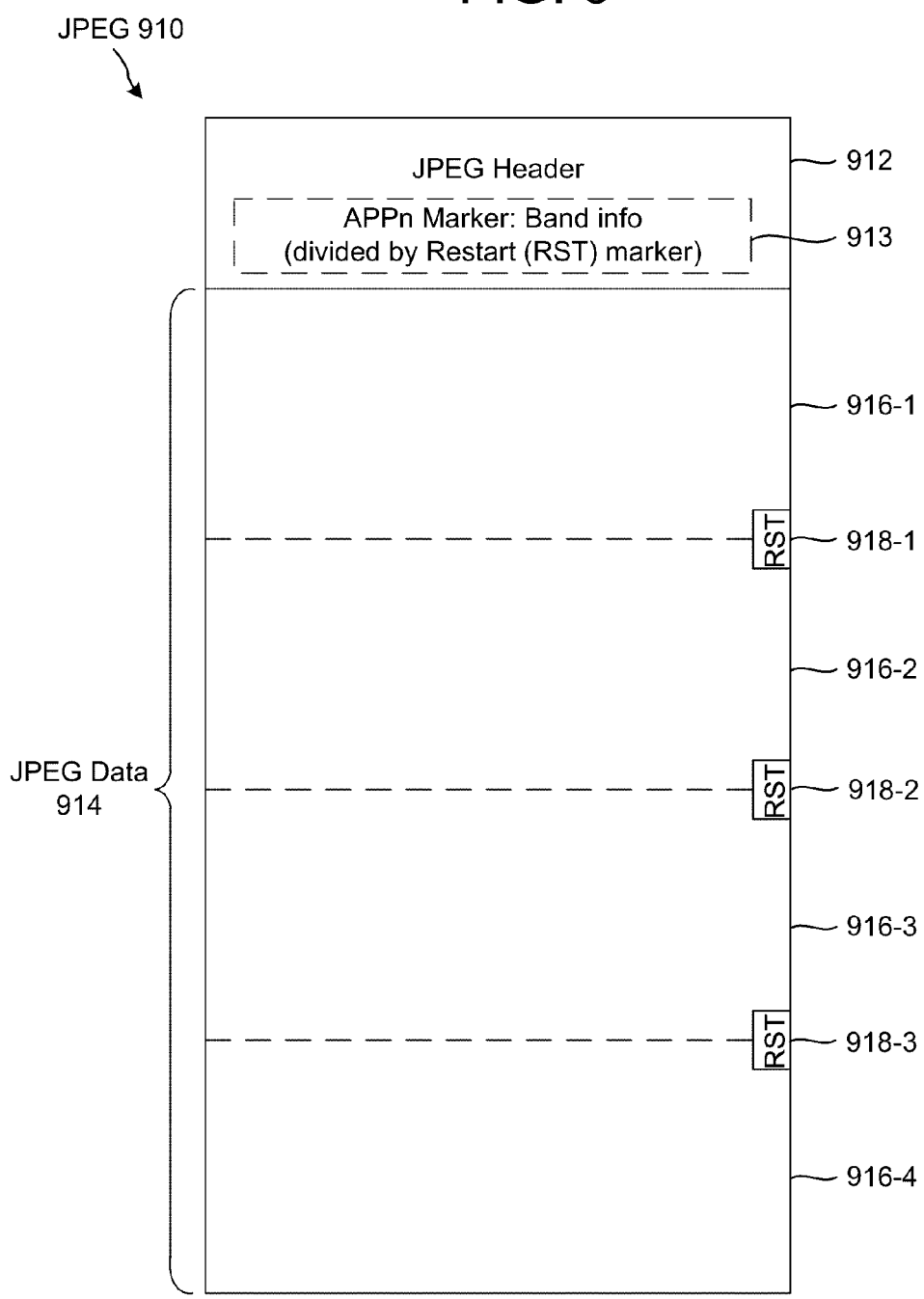
FIG. 9 illustrates an example of a JPEG image with restart markers embedded to allow for parallel decoding according to embodiments of the present disclosure.

FIG. 9 illustrates an example of a JPEG image with restart markers embedded to allow for parallel decoding according to embodiments of the present disclosure. As illustrated in FIG. 9, a JPEG 910 may include a JPEG header 912 including an APPn marker 913, along with JPEG data 914. The JPEG data 914 may be divided into first JPEG data 916-1, second JPEG data 916-2, third JPEG data 916-3 and fourth JPEG data 916-4, which are separated by first restart marker 918-1, second restart marker 918-2 and third restart marker 918-3.

The JPEG 910 may be decoded and displayed as raw image data including a series of pixels based on a resolution of the JPEG 910, the series of pixels broken into rows of pixels (e.g., scan lines) with a width of the JPEG 910 being a number of pixels in each row and a height of the JPEG 910 being a number of rows. Thus, each scan line includes a single row of pixels, extending from a beginning pixel in the row to an end pixel in the row. The JPEG data 914 corresponds to the series of pixels and may therefore be split into sections of JPEG data 916 based upon the scan lines. To simplify a decoding process, the RST markers 918 may be located at the end of the scan lines. Thus, each of the RST markers 918 may be located at the end of a final scan line in a corresponding section of JPEG data 916. For example, the first restart marker 918-1 may be located at the end of the scan line in the final row of the first JPEG data 916-1. Thus, if the first JPEG data 916-1 has a height of 256 rows, the first restart marker 918-1 may be located after data corresponding to the end pixel in the 256th row.

By locating the RST markers 918 at the end of the scan lines, the JPEG data 914 may be split into the sections of JPEG data 916, which may be referred to as bands of data, using a band height so that most of the sections of JPEG data 916 correspond to raw image data having a number of scan lines equal to the band height. For example. if the JPEG data 914 is split into n sections, a height of the JPEG 910 may be divided by n to determine the band height, and n−1 RST markers may be inserted based upon the band height. As illustrated in FIG. 9, the JPEG 910 is divided into four sections of JPEG data 916 using three RST markers 918. If a beginning of the first JPEG data 916-1 corresponds to a first scan line at a beginning of the raw image data, a beginning of the second JPEG data 916-2 corresponds to a second scan line separated from the first scan line by the band height, a beginning of the third JPEG data 916-3 corresponds to a third scan line separated from the second scan line by the band height (and separated from the first scan line by two band heights) and a beginning of the fourth JPEG data 916-4 corresponds to a fourth scan line separated from the third scan line by the band height (and separated from the first scan line by three band heights). Therefore, locating the RST markers 918 at the end of the scan lines simplifies a decoding process by dividing the JPEG 910 into sections (bands of data) using the band height so that raw image data decoded from the sections include a substantially similar number of scan lines.

While each of the sections of JPEG data 916 may correspond to a similar number of scan lines (e.g., each of the sections of JPEG data 916 correspond to a height of 256 rows or scan lines in the raw image data), the disclosure is not limited thereto. If the raw image data cannot be split into sections having similar heights, the first JPEG data 916-1, the second JPEG data 916-2 and the third JPEG data 916-3 may correspond to a first height (e.g., a height equal to the band height) and the fourth JPEG data 916-4 may correspond to a second height equal to a difference between the total height associated with the raw image data and three times the band height. Thus, locations in the raw image data corresponding to a beginning of each of the sections of JPEG data 916 may be determined using the band height, while a number of scan lines in the raw image data corresponding to the fourth JPEG data 916-4 may be based on the second height. For example, if the JPEG 910 corresponds to a total height of 1024 scan lines, each of the sections of JPEG data 916 may correspond to a height of 256 scan lines. However, if the JPEG 910 corresponds to a total height of 1018 scan lines, the first JPEG data 916-1, the second JPEG data 916-2 and the third JPEG data 916-3 may correspond to a first height of 256 scan lines while the fourth JPEG data 916-4 may correspond to a height of 250 scan lines.

In some examples, the band height may be chosen using a fixed multiple, such as a multiple of 8 or 16. For example, if the band height is limited by 16n scan lines per section for four sections, 203 scan lines may be divided so that three sections include 64 scan lines and a fourth section includes 11 scan lines. In contrast, if the band height is limited by 8n scan lines per section for four sections, 203 scan lines may be divided so that the three sections include 56 scan lines and the fourth section includes 35 scan lines. Thus, the number of scan lines may be even for each of the sections except for the final section, and a band height may be determined based on the fixed multiple and the number of sections.

If the JPEG 910 is a black and white image, a size of raw image data associated with the JPEG 910 may be based on a resolution of the JPEG 910 such that each pixel corresponds to a byte of raw image data (e.g., bytes per pixel equal to 1). For example, if the JPEG 910 has a resolution of 768 pixels by 1024 pixels, the raw image data may have a size of 786,432 bytes. If the JPEG 910 is divided into four sections as illustrated in FIG. 9, each of the sections of JPEG data 916 may correspond to raw image data having a resolution of 768 pixels by 256 pixels and a size of 196,608 bytes. A size of raw image data corresponding to the band height may be referred to as a byte offset. In this example, the band height is 256 scan lines and the byte offset is 196,608 bytes. The byte offset may be determined by scanning the JPEG data 914 for RST markers 918 and determining the number of bytes of raw image data associated with each of the sections of JPEG data 916. The byte offset may be stored in the APPn marker 913 and used to parallel decode the JPEG 910.

During parallel decoding of the JPEG 910, the device 102 may decode each of the sections of JPEG data 916 to respective buffer locations using location offsets. The location offsets may be used to decode the JPEG 910 in parallel to the buffer so that decoded image data (e.g., raw image data) from the JPEG 910 is sequentially stored in the buffer. The location offsets indicate an offset between the starting address of the buffer and buffer locations corresponding to respective beginnings of the sections of JPEG data 916. The location offsets may be determined based on the byte offset, the band height, a number of bytes per pixel, a width of the JPEG 910 and/or a number of prior bands. In some examples, the number of bytes per pixel for a black and white image may be equal to 1 and a number of bytes per pixel for a color image may be equal to 3. In a first example, the device 102 may determine a location offset using the byte offset. For example, a first location offset may be 0 (e.g., the starting address of the buffer), a second location offset may be equal to the byte offset (e.g., 19,200 bytes), a third location offset may be equal to twice the byte offset (e.g., 38,400 bytes), and a fourth location offset may be equal to three times the byte offset (e.g., 57,600 bytes). In a second example, the device 102 may determine the location offset using the number of bytes per pixel, the band height, the width of the JPEG 910 and the number of prior bands. For example, to determine the location offset for the third JPEG data 916-3, the device 102 may multiply the number of bytes per pixel (e.g., 3 bytes/pixel) by the band height (e.g., 64 scan lines), the width of the JPEG 910 (e.g., 100 pixels) and the number of prior bands (e.g., 2), for a location offset of $3 \times 64 \times 100 \times 2 = 38,400$ bytes. In a third example, the device 102 may determine the location offset using the number of bytes per pixel, the width of the JPEG 910 and the number of previous scan lines. In the second example, the number of previous scan lines was calculated by multiplying the number of prior bands by the band height, but if a height of any of the prior bands differed from the band height, number of previous scan lines is different.

If the JPEG 910 is a black and white image as discussed above, the number of bytes per pixel is equal to 1. Therefore, a beginning of the first JPEG data 916-1 may be decoded to a first location in the buffer offset from a starting address of the buffer by a first location offset (e.g., $1 \times 768 \times 256 \times 0$), a beginning of the second JPEG data 916-2 may be decoded to a second location in the buffer offset from the starting address of the buffer by a second location offset (e.g., $1 \times 768 \times 256 \times 1$), a beginning of the third JPEG data 916-3 may be decoded to a third location in the buffer offset from the starting address of the buffer a third location offset (e.g., $1 \times 768 \times 256 \times 2$) and a beginning of the fourth JPEG data 916-4 may be decoded to a fourth location in the buffer offset from the starting address of the buffer a fourth location offset (e.g., $1 \times 768 \times 256 \times 3$). Thus, decoded data corresponding to the first JPEG data 916-1 is offset from the starting address of the buffer by 0, decoded data corresponding to the second JPEG data 916-2 is offset from the starting address of the buffer by 196,608 bytes ($1 \times 768 \times 256 \times 1$), decoded data corresponding to the third JPEG data 916-3 is offset from the starting address of the buffer by 393,216 bytes ($1 \times 768 \times 256 \times 2$) and decoded data corresponding to the fourth JPEG data 916-4 is offset from the starting address of the buffer by 589,824 bytes ($1 \times 768 \times 256 \times 3$).

If the JPEG 910 is a color image, each pixel of the JPEG 910 correspond to more than a byte of raw image data and the bytes per pixel may be greater than one. To illustrate how to determine the location offsets, the number of bytes per pixel will be set equal to three. Therefore, a beginning of the first JPEG data 916-1 may be decoded to a first location in the buffer offset from a starting address of the buffer by a first location offset (e.g., 3×768×256×0), a beginning of the second JPEG data 916-2 may be decoded to a second location in the buffer offset from the starting address of the buffer by a second location offset (e.g., 3×768×256×1), a beginning of the third JPEG data 916-3 may be decoded to a third location in the buffer offset from the starting address of the buffer a third location offset (e.g., 3×768×256×2) and a beginning of the fourth JPEG data 916-4 may be decoded to a fourth location in the buffer offset from the starting address of the buffer a fourth location offset (e.g., 3×768×256×3). Thus, decoded data corresponding to the first JPEG data 916-1 is offset from the starting address of the buffer by 0, decoded data corresponding to the second JPEG data 916-2 is offset from the starting address of the buffer by 589,824 bytes (3×768×256×1), decoded data corresponding to the third JPEG data 916-3 is offset from the starting address of the buffer by 1,179,648 bytes (3×768×256×2) and decoded data corresponding to the fourth JPEG data 916-4 is offset from the starting address of the buffer by 1,769,472 bytes (3×768×256×3).

While FIG. 9 illustrates the RST markers 918 located at the end of the scan lines, the disclosure is not limited thereto. Instead, the RST markers 918 may be located within the scan lines without departing from the disclosure. However, locating the RST markers 918 within the scan lines complicates parallel decoding of the JPEG 910 as the device 102 cannot calculate the location offsets using the method described above. With the RST markers 918 at the end of the scan lines, the location offsets are calculated using the number of bytes per pixel, the byte offset, the band height and/or a width of the JPEG 910. With the RST markers 918 located within the scan lines, the device 102 may not easily determine an amount of data on the scan line prior/subsequent to the RST marker 918. To allow parallel decoding of the JPEG data 914 despite the RST markers 918 located with the scan lines, the device 102 may use multiple buffers and combine the decoded data after the decoding process is complete. For example, if the device 102 uses two cores to decode two sections of JPEG data substantially simultaneously, the device 102 may decode the first section of JPEG data to a first buffer and decode the second section of JPEG data to a second buffer. After the decoding is complete, the device 102 may either add the decoded data from the second buffer to the decoded data from the first buffer, or combine the decoded data from the first buffer and the second buffer in a separate location in memory. Thus, the device 102 may decode the JPEG data 914 in parallel despite the RST markers 918 being located within the scan lines.

While FIG. 9 illustrates the JPEG header 912 including the APPn marker 913, the disclosure is not limited thereto. Instead, the JPEG header 912 may include APPn markers in addition to the APPn marker 913 and/or the APPn marker 913 may be located anywhere within the JPEG 910 and is therefore not limited to the JPEG header 912. To enable the JPEG 910 to be parallel decoded, the APPn marker 913 may include a band height associated with the JPEG data 916, which indicates a height (e.g., number of scan lines) of the sections of JPEG data 916 (except, potentially, a final section of JPEG data 916) and the number of scan lines separating the RST markers 918. In addition to the band height, the APPn marker 913 (or separate APPn markers) may include an identification number for the APPn marker 913, which identifies the APPn marker as being used to parallel decode the JPEG 910. The APPn marker 913 (or separate APPn markers) may also include an original image height of the JPEG 910 and the byte offset, although the disclosure is not limited thereto and the device 102 may determine the original image height and the byte offset directly from the JPEG 910. For example, the device 102 may obtain the original image height from the JPEG header 912, and may calculate the byte offset by scanning through the JPEG data 914 for positions of the RST markers 918. However, these steps may be performed in advance and the original image height and byte offset saved in the APPn marker 913 to reduce a time associated with the decoding process.

While the description above relates to a buffer, such as a raw image buffer, the disclosure is not limited thereto. Instead, the device 102 may decode the JPEG 910 to a memory or a hard disk. For example, instead of a beginning of the first JPEG data 916-1 being decoded to a first location in the buffer, the beginning of the first JPEG data 916-1 may be decoded to a first location in the memory or the hard disk. The device 102 may decode a beginning of the second JPEG data 916-2 to a second location in the memory or the hard disk offset from the first location by the second location offset. Similarly, the device 102 may decode a beginning of the third JPEG data 916-3 to a third location in the memory or the hard disk offset from the first location by the third location offset, and decode a beginning of the fourth JPEG data 916-4 to a fourth location in the memory or the hard disk offset from the first location by the fourth location offset. Thus, the device 102 may determine the first location, the second location, the third location and the fourth location based on the first offset, the second offset, the third offset an the fourth offset. As an alternative, in some embodiments the first location, the second location, the third location and/or the fourth location may be separate locations within the memory or hard disk and therefore not based on the first offset, the second offset, the third offset and/or the fourth offset. Thus, the decoded image data may not be stored sequentially after the decoding process is complete. Instead, the device 102 may store the decoded image data in the separate locations or may combine the decoded image data in a new location in the memory or the hard disk.

Figure 10:
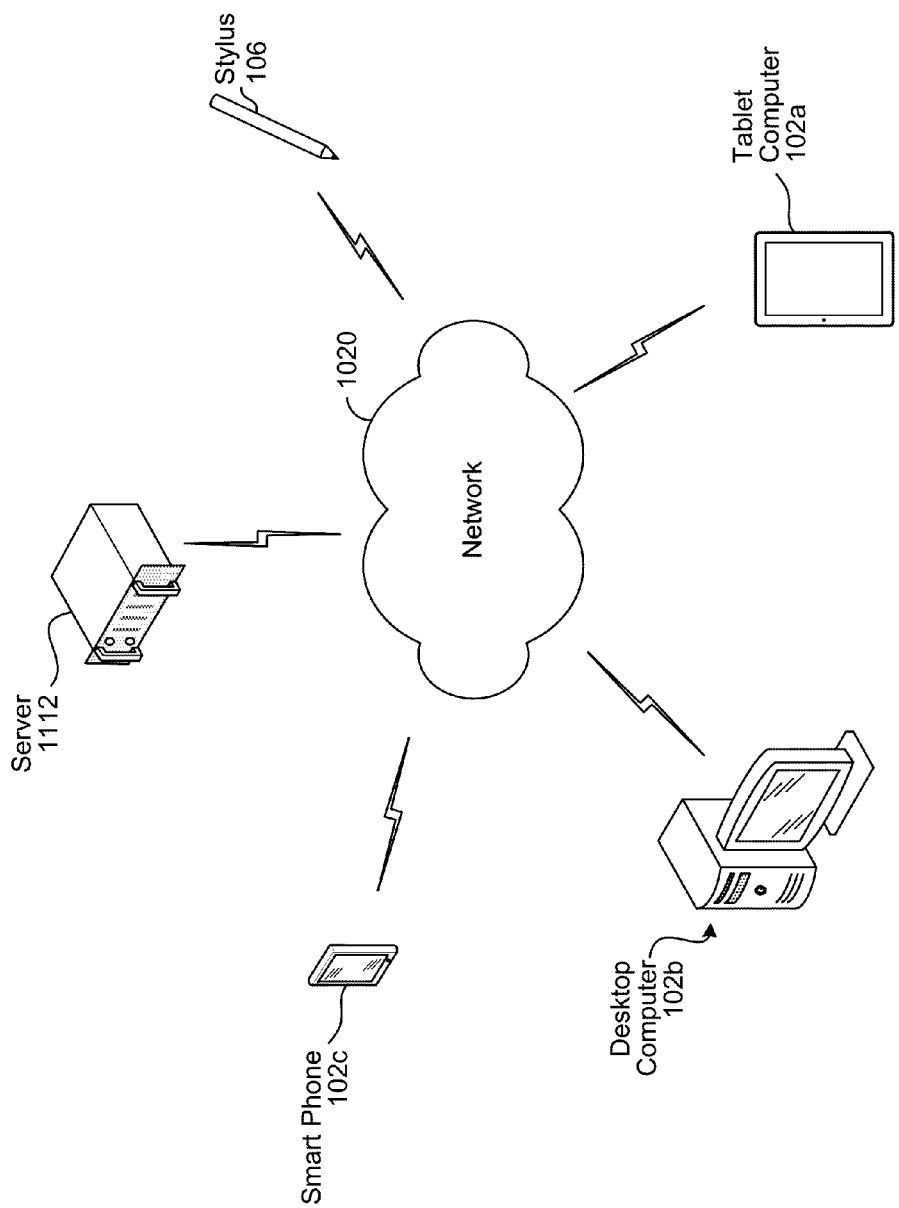
FIG. 10 is a block diagram conceptually illustrating an example of a computer network for use with the present system.

As shown in FIG. 10, multiple devices may be connected over a network 1020. The network 1020 may include a local or private network or may include a wide network such as the internet. Devices may be connected to the network 1020 through either wired or wireless connections. For example, a smart phone 102c may be connected to the network 1020 through a wireless service provider. Other devices, such as desktop computer 102b and/or server 101112, may connect to the network 1020 through a wired connection.

Figure 11A:
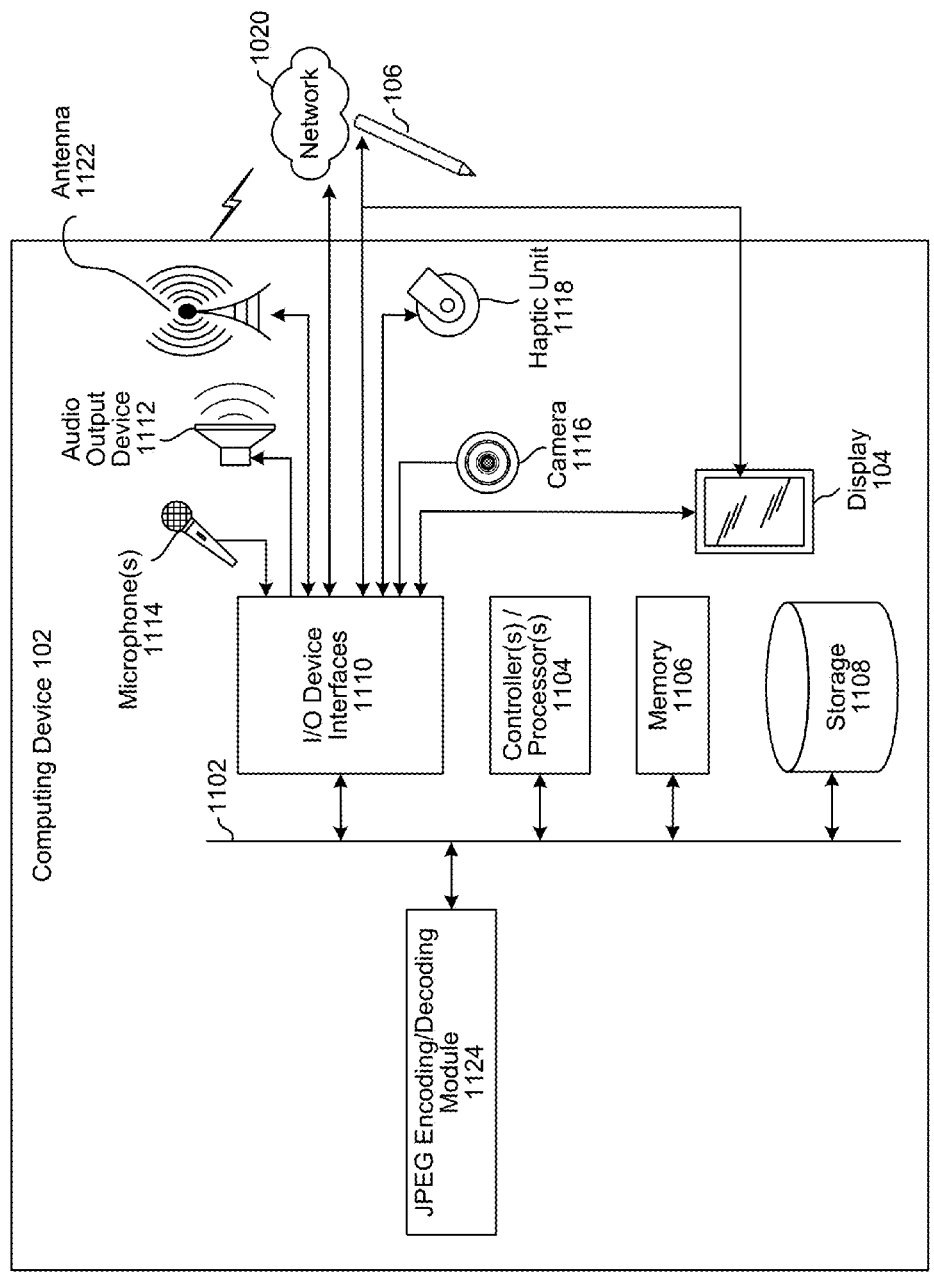

FIGS. 11A and 11B illustrate block diagrams conceptually illustrating example components of a system including one or more of a computing device 102 and a remote server 1112. Depending upon how the system is structured, some of the components illustrated in FIG. 11A as part of the device 102 or in FIG. 11B as part of the remote server 1112 may be included only in the device 102 or in the server 1112, or may be distributed across multiple devices 102 and/or servers 1112. Other components not illustrated may also be included in the device 102 and/or the server 1112. In operation, the system may include computer-readable and computer-executable instructions that reside in storage 1108 on the device 102 and/or server 1112. The device 102 may be a computer, set-top box or a portable device, such as an electronic reader, a smart phone, tablet, smart watch, or the like. The server 1112 may be a single server or a group of servers.

The teachings of the present disclosure may be applied within a number of different devices and computer systems, including, for example, general-purpose computing systems, server-client computing systems, mainframe computing systems, telephone computing systems, laptop computers, cellular phones, personal digital assistants (PDAs), tablet computers, other mobile devices, etc.

As illustrated in FIG. 11, the computing device 102 may include an address/data bus 1102 for conveying data among components of the computing device 102. Each component within the computing device 102 may also be directly connected to other components in addition to (or instead of) being connected to other components across the bus 1102.

The computing device 102 and/or server 1112 may be multi-core systems and may therefore include one or more microcontrollers/controllers/processors 1104 that may each include one-or-more central processing units (CPUs) for processing data and computer-readable instructions, and a memory 1106 for storing data and instructions. The memory 1106 may include volatile random access memory (RAM), non-volatile read only memory (ROM), non-volatile magnetoresistive (MRAM) and/or other types of memory. The computing device 102 and/or server 1112 may also include a data storage component 1108, for storing data and microcontrollers/controller/processor-executable instructions (e.g., instructions to perform one or more steps of the methods illustrated in and described with reference to FIG. 1 or 8). The data storage component 1108 may include one or more non-volatile storage types such as magnetic storage, optical storage, solid-state storage, etc. The computing device 102 and/or server 1112 may also be connected to removable or external non-volatile memory and/or storage (such as a removable memory card, memory key drive, networked storage, etc.) through input/output device interfaces 1110.

Computer instructions for operating the computing device 102 and/or server 1112 and their various components may be executed by the microcontroller(s)/controller(s)/processor(s) 1104, using the memory 1106 as temporary "working" storage at runtime. The computer instructions may be stored in a non-transitory manner in non-volatile memory 1106, storage 1108, or an external device. Alternatively, some or all of the executable instructions may be embedded in hardware or firmware in addition to or instead of software.

The computing device 102 includes input/output device interfaces 1110. A variety of components may be connected through the input/output device interfaces 1110, such as the display or display screen 104 having a touch surface or touchscreen; an audio output device for producing sound, such as speaker(s) 1112; one or more audio capture device(s), such as a microphone or an array of microphones 1114; one or more image and/or video capture devices, such as camera(s) 1116; one or more haptic units 1118; and other components. The display 104, speaker(s) 1112, microphone(s) 1114, camera(s) 1116, haptic unit(s) 1118, and other components may be integrated into the computing device 102 or may be separate.

The display 104 may be a video output device for displaying images. The display 104 may be a display of any suitable technology, such as a liquid crystal display, an organic light emitting diode display, electronic paper, an electrochromic display, a cathode ray tube display, a pico projector or other suitable component(s). The display 104 may also be implemented as a touchscreen and may include components such as electrodes and/or antennae for use in detecting stylus input events or detecting when a stylus is hovering above, but not touching, the display 104.

The input/output device interfaces 1110 may also include an interface for an external peripheral device connection such as universal serial bus (USB), FireWire, Thunderbolt, Ethernet port or other connection protocol that may connect to networks 1220. The input/output device interfaces 1110 may also include a connection to antenna 1122 to connect one or more networks 1220 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The computing device 102 and/or the server 1112 further includes a JPEG Encoding/Decoding module 1124. The JPEG Encoding/Decoding module 1126 may control filtering of an input to the device 102 as discussed above, specifically with regard to FIGS. 1 and/or 8. Some or all of the controllers/modules of the JPEG Encoding/Decoding module 1124 may be executable instructions that may be embedded in hardware or firmware in addition to, or instead of, software. In one embodiment, the computing device 102 may operate using an Android® operating system (such as Android® 4.3 Jelly Bean, Android® 4.4 KitKat or the like).

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

The concepts disclosed herein may be applied within a number of different devices and computer systems, including, for example, general-purpose computing systems, televisions, stereos, radios, server-client computing systems, mainframe computing systems, telephone computing systems, laptop computers, cellular phones, personal digital assistants (PDAs), tablet computers, wearable computing devices (watches, glasses, etc.), other mobile devices, etc. that can operate with a touchscreen.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware, and/or hardware. Further, the teachings of the disclosure may be performed by an application specific integrated circuit (ASIC), field programmable gate array (FPGA), or other component, for example.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for parallel decoding a Joint Photographic Experts Group (JPEG) image on a device, the method comprising:
receiving a JPEG image, the JPEG image comprising image data and restart markers, wherein the restart markers comprise data embedded within the image data used to separate the image data into smaller sections of image data, and wherein positions of each of the restart markers in the image data correspond to a determined number of scan lines in decoded image data;
receiving a header associated with the JPEG image, the header comprising:
a size of the image data, and
the determined number of scan lines;
determining a number of cores included in a device;
dividing the image data into at least a first section and a second section based on a number of the restart markers and the number of cores included in the device, the dividing further comprising determining a size of the image data included in the first section and the second section based on the number of cores and the number of restart markers;
determining a first address for the first section and a second address for the second section, the first address indicating a first location in a buffer for storing first decoded data from the first section and the second address indicating a second location in the buffer for storing second decoded data from the second section;
decoding the first section using a first core of the cores to generate the first decoded data;
storing the first decoded data to the first location;
decoding the second section using a second core of the cores to generate the second decoded data; and
storing the second decoded data to the second location.

2. The computer-implemented method of claim 1, wherein the dividing further comprises:
determining a total number of sections for the image data by adding one to the number of restart markers;
dividing the total number of sections by the number of cores to determine an allocated number of sections per core;
associating image data with the first section based on the allocated number of sections per core, the first section beginning with an initial section of the image data; and
associating data with the second section according to the allocated number of sections per core, the second section subsequent to the first section.

3. The computer-implemented method of claim 1, wherein determining the first address further comprises:
identifying an application marker embedded in the header;
obtaining a total size of the image data, a size of the first section and a size of the second section from the application marker;
determining the first address based on the total size of the image data; and
determining the second address by offsetting the first address by the size of the first section.

4. The computer-implemented method of claim 1, further comprising:
obtaining a raw JPEG image, the raw JPEG image including image data and not including restart markers;
determining a number of sections into which to divide the image data;
inserting the number of restart markers in the image data based at least in part on a location offset, the number of restart markers one less than the number of sections; and
storing information associated with the restart markers in an application marker associated with the image data to generate the JPEG image.

5. A computer-implemented method, comprising:
identifying a number of first markers in a first image;
determining a number of cores included in a device;
determining, based on the number of cores and the number of first markers, a first size of image data;
identifying, based at least in part on the number of first markers, a first section of image data having the first size, the image data associated with the first image;
identifying, based at least in part on the number of first markers, a second section of the image data having the first size;
determining a first address for the first section, the first address indicating a first location for storing first decoded data from the first section;
determining a second address for the second section, the second address indicating a second location for storing second decoded data from the second section, the second location based on an offset from the first location;
decoding the first section using a first core on the device to generate the first decoded data;
storing the first decoded data to the first location;
decoding the second section using a second core on the device to generate the second decoded data, the second section decoded at least partially concurrently with the first section; and
storing the second decoded data to the second location.

6. The computer-implemented method of claim 5, further comprising:
determining a total number of sections for the image data by adding one to the number of first markers;
dividing the total number of sections by a number of cores to determine an allocated number of sections per core;
associating image data with the first section based on the allocated number of sections per core, the first section beginning with an initial section of the image data; and
associating data with the second section based on the allocated number of sections per core, the second section subsequent to the first section.

7. The computer-implemented method of claim 6, further comprising:
identifying an application marker embedded in the image data; and
obtaining a total size of the image data and a size of each section of the image data from the application marker, wherein
the first address is determined based on the total size of the image data, and
the second address is determined by offsetting the first address by a size of each section multiplied by the allocated number of sections per core.

8. The computer-implemented method of claim 5, wherein a decoded image is stored sequentially beginning at the first location without moving the second decoded data from the second location.

9. The computer-implemented method of claim 5, wherein the first section includes first image data and second image data, the second image data separated from the first image data by one of the first markers.

10. The computer-implemented method of claim 5, wherein a first header associated with the first image includes a size of the image data, the method further comprising:
generating a second header associated with the first section, the second header including the size of image data associated with the first section.

11. The computer-implemented method of claim 5, wherein the first image is embedded in a non-image file, the non-image file being formatted as an electronic document.

12. A computing device, comprising:
at least one core;
a memory device including instructions operable to be executed by the at least one core to cause the device to:
identify a number of first markers in a first image;
identify a first header associated with the first image, the first header including a first size of image data associated with the first image;
identify a first section of the image data based at least in part on the number of first markers;
generate a second header associated with the first section, the second header including a second size of the image data that is associated with the first section;
identify a second section of the image data based at least in part on the number of first markers;
generate a third header associated with the second section, the third header including the second size of the image data that is associated with the second section;
determine a first address for the first section, the first address indicating a first location for storing first decoded data from the first section;
determine a second address for the second section, the second address indicating a second location for storing second decoded data from the second section, the second location based on an offset from the first location;
decode the first section using a first core on a device to generate the first decoded data;
store the first decoded data to the first location;
decode the second section using a second core on the device to generate the second decoded data, the second section decoded at least partially concurrently with the first section; and
store the second decoded data to the second location.

13. The device of claim 12, wherein the instructions further configure the device to:
determine a total number of sections for the image data by adding one to the number of first markers;
divide the total number of sections by a number of cores to determine an allocated number of sections per core;
associate image data with the first section based on the allocated number of sections per core, the first section beginning with an initial section of the image data; and
associate data with the second section based on the allocated number of sections per core, the second section subsequent to the first section.

14. The device of claim 13, wherein the instructions further configure the device to:
identify an application marker embedded in the image data;
obtain a total size of the image data and a size of each section of the image data from the application marker;
determine the first address based on the total size of the image data; and
determine the second address by offsetting the first address by a size of each section multiplied by the allocated number of sections per core.

15. The device of claim 12, wherein a decoded image is stored sequentially beginning at the first location without moving the second decoded data.

16. The device of claim 12, wherein the instructions further configure the device to:
determine a number of cores included in the device, and
determine a size of image data included in the first section and the second section based on the number of cores and the number of first markers.

17. The device of claim 16, wherein the first section includes first image data and second image data, the second image data separated from the first image data by one of the first markers.

18. The device of claim 12, wherein the first image is embedded in a non-image file, the non-image file being formatted as an electronic document.

* * * * *